US007734600B1

(12) United States Patent
Wise et al.

(10) Patent No.: US 7,734,600 B1
(45) Date of Patent: Jun. 8, 2010

(54) APPARATUS, METHOD AND SYSTEM TO IMPLEMENT AN INTEGRATED DATA SECURITY LAYER

(76) Inventors: Michael Wise, 2820 Arizona Ave., NW., Washington, DC (US) 20016; Howard M. Singer, 115 Rico Dr. N., Morganville, NJ (US) 07751

( * ) Notice: Subject to any disclaimer, the term of this patent is extended or adjusted under 35 U.S.C. 154(b) by 695 days.

(21) Appl. No.: 10/737,870

(22) Filed: Dec. 16, 2003

Related U.S. Application Data

(60) Provisional application No. 60/444,969, filed on Feb. 5, 2003.

(51) Int. Cl.
*G06F 17/30* (2006.01)
*G06F 17/40* (2006.01)

(52) U.S. Cl. .................. 707/694; 707/661; 707/758; 707/781; 707/822

(58) Field of Classification Search ............. 707/1–10, 707/100–104.1
See application file for complete search history.

(56) References Cited

U.S. PATENT DOCUMENTS 6,052,788 A * 4/2000 Wesinger et al. ............... 726/11
6,981,155 B1 * 12/2005 Lyle et al. ..................... 726/22
7,035,850 B2 * 4/2006 Arai et al. ...................... 707/6
2002/0033844 A1 * 3/2002 Levy et al. ................... 345/744
2002/0116627 A1 * 8/2002 Tarbotton et al. ........... 713/200
2003/0061287 A1 * 3/2003 Yu et al. ...................... 709/205
2004/0054675 A1 * 3/2004 Li .............................. 707/100

* cited by examiner

*Primary Examiner*—Tim T. Vo
*Assistant Examiner*—Shangwoo Anh
(74) *Attorney, Agent, or Firm*—Gottlieb, Rackman & Reisman, P.C.

(57) ABSTRACT

The disclosure details the implementation of an apparatus, method, and system for an integrated data security layer (IDSL). In one aspect, the IDSL enables entities wishing to control users' data access, whether they are content owners, corporate system administrators, or concerned parents wishing to prevent ill-gotten data to work across their systems, to manage the access of content. The IDSL provides the ability to curb such unwanted access of data. The IDSL has the ability to obtain content information, policy rules regarding the content, and unique identifiers for the content from content providers and/or their proxies. Further, the IDSL has the ability to provide such information to IDSL clients. Such clients employ the obtained information to analyze and control access to the content. Additionally, the IDSL may act as a lookup facility to create, maintain, and update associations between a content information, policy rules, and unique identifiers of content, and any other associated information as detailed throughout. The IDSL coordinates with an IDSL database to identify interassociated items in the generation of entries regarding any related information.

5 Claims, 2 Drawing Sheets

APPARATUS, METHOD AND SYSTEM TO IMPLEMENT AN INTEGRATED DATA SECURITY LAYER

The present application claims priority under 35 USC 119 to provisional patent application Ser. No. 60/444,969, filed Feb. 5, 2003, herein incorporated by reference.

FIELD

The present invention is directed generally to an apparatus, method, and system of integrating data security, and more particularly, to an apparatus, method and system to install, analyze, capture, flag and dispose of targeted data and set policies for the targeted data.

BACKGROUND

Virus Detection

As data interchange has increased across networks, so has the addition of unwanted and sometimes malicious content modifiers. Crackers, terrorists, and/or content thieves have employed various nefarious means to breach the security of computer systems including viruses and worms. One such method is to embed a small program within an otherwise normal file. Such malicious code segments are commonly called Trojan horses. To counteract this type of activity, software has been developed to scan memory for segments of malicious code and to remove them.

Network Transfer Mechanisms

The proliferation and expansion of computer information systems coincides with an increase in network use. More and more often, people are using computer networks and software to transfer large amounts of data. The increased communications over the Internet has resulted in an explosion of data transfers that are inappropriate in various contexts. For example, in corporate settings, individual employees are accessing data content inappropriate to the work environment while in consumer settings underage children are accessing inappropriate content.

One model enabling file transfer is the peer-to-peer (P2P) model. This communication model provides each party with the same capabilities and either party can initiate a communication session. Peers are often referred to as nodes on a network. Controlling data spread through P2P networks has proven difficult and challenging for system administrators because of the decentralized nature of such networks.

Organizations may experience increased security risks and/or liability resulting from the independent actions taken by their employees. Consumers may experience similar risks from the independent actions taken by family members and others with access to said consumer's machines and Internet connection. In an attempt to curb such transfers, system administrators often resort to firewalls to disable the transfer of data across their systems. A firewall provides very coarse management of network ports to system administrators. The firewall is a content agnostic mechanism that can open or close a communications port. As such, any programs that were using the port, legitimate or otherwise, are enabled (when the port is open) or prevented (when the port is closed) from communicating across the port.

SUMMARY

Although virus detection software has attempted to identify and extract malicious code segments embedded in data, no effective solution exists to manage the large unadulterated torrents of data such as large media files that are being obtained through illicit channels. Also, firewalls have failed to allow system administrators to effectively control the trafficking of illicit content. Furthermore, no effective mechanism exists for those wishing to manage how others access content. Owners of systems (both in the enterprise and consumer) need a system to prevent others from transferring ill-gotten data across their systems. In accordance with the present invention, an integrated data security layer allows an organization to curb such unwanted access of data.

In accordance with certain aspects of the disclosure, the above-identified problems of identifying, disposing, and/or managing illegitimate data content from (un)trusted sources are overcome and a technical advance is achieved in the art of integrating data security. An exemplary integrated data security layer (IDSL) includes a method to analyze data on a computer. In one embodiment, the method entails generating a local unique data identifier from data accessible by a computer, obtaining policy rules for unadulterated data, comparing the local unique data identifier to a unique data identifier obtained by the computer, and taking an action if the local unique data identifier matches the obtained unique data identifier. As such, the policy rules may prevent a user from unauthorized access to the unadulterated data.

In accordance with another embodiment, an apparatus to provide access records to a security layer facility is disclosed. The apparatus has a memory for storing instructions and a processor that can issue the instructions. The stored instructions issue signals to obtain a unique data identifier for unauthorized multimedia files, obtain policy rules for the unauthorized multimedia files, store the unique data identifier and policy rules in a database, and provide access to the interassociated records to a security layer facility.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate various non-limiting, example, inventive aspects of the present disclosure.

The leading number of each reference number within the drawings indicates the first figure in which that reference

DETAILED DESCRIPTION

In the following description of the various embodiments, reference is made to the accompanying drawings that form a part hereof, and in which is shown by way of illustration various embodiments in which the invention may be practiced. It is to be understood that other embodiments may be utilized and organizational, functional, structural and/or topological modifications may be made without departing from the scope of the present invention. As such, all examples and/or embodiments are deemed to be non-limiting throughout this disclosure.

Integrated Data Security Layer

Figure 1:
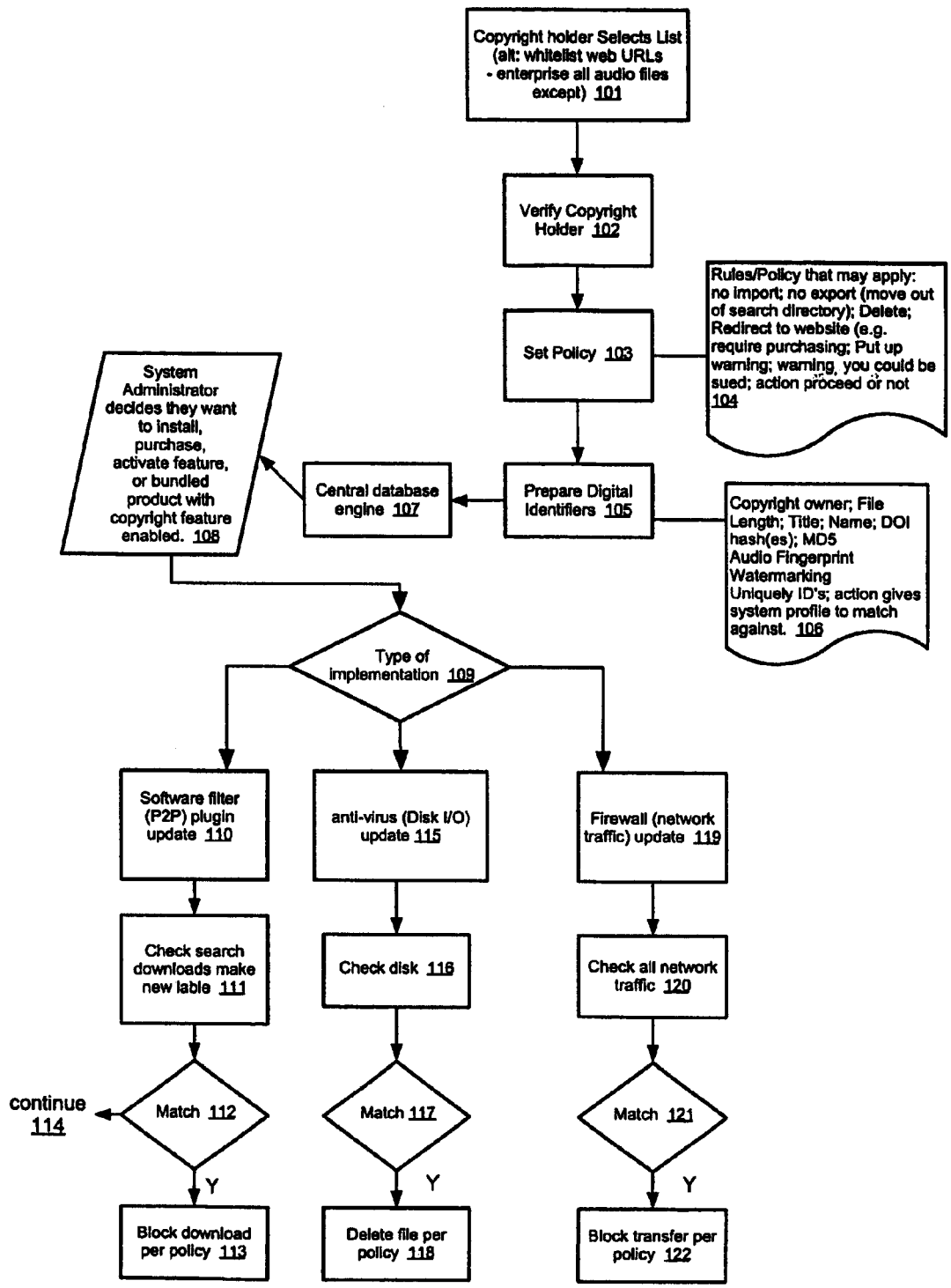
FIG. 1 is of a flow diagram illustrating one embodiment of operations of an integrated data security layer in accordance with the present invention.

FIG. 1 illustrates one embodiment of an Integrated Data Security Layer (IDSL). It is important to note, that although FIG. 1 employs a flow diagram for purposes of illustration, different portions of the flow may be occurring concurrently, and/or may be temporally disjoint. Also, different areas of the flow diagram may be engaged as needed by other systems and/or users. Although some of the components are mentioned throughout FIG. 1, FIG. 2 goes on to describe the various components and topology of the IDSL in greater detail.

An entity wishing to exercise control over the access of content (e.g., a copyright holder) may provide a content control list 101. A content control list enumerates content that they wish to be monitored by an IDSL 101. The list itself may be comprised of unique data identifiers that correspond to unadulterated data, content information, policy rules, and/or copies of the unadulterated data itself. Additionally, the list may be comprised of tagged unique data identifiers, wherein the tags are used by client IDSL modules and/or the IDSL database for reference. For example, MD5 hashes may be generated from unadulterated data that uniquely identifies the data. Alternatively, the list may be comprised of any combination of the aforementioned elements. There are a number of mechanisms for delivering the content control list 101 to the IDSL controller. In one embodiment, the content control list 101 may be provided as an http post in structured XML. In an alternative embodiment, the list may be provided via ftp to the IDS.

Upon provision of the content control list 101, the IDSL verifies that the provisioning entity is authorized 102 to set control policies. In one embodiment, access to the IDSL is provided via Web browser access. Such Web browser access is provided through an information server. Authorization may be achieved by obtaining verifying information from the provisioning entity. Numerous forms of verification may be employed. In one embodiment, the provisioning entity supplies a user name and password to the IDSL as cross-referenced against authorizing records in an IDSL database. In an alternative embodiment, a digital signature is provided. If the username and password match records in the database, then flow may continue to the setting of the policy 103.

Most frequently, the provisioning entity will wish to control data to which they have rights (e.g., copyrights) by limiting access. In one embodiment this is achieved by providing the content control list as a "black-list." Alternatively, the entity may provide a "white-list." The white-list would allow unfettered access to items enumerated within, while access to all un-enumerated items would be prohibited. Conversely, the items enumerated on the black-list would be controlled by settings as established by the setting of policy rules 103. Generally, the IDSL would allow unfettered access to all content not enumerated in a black-list, while applying policy rules 103 to items enumerated in the black-list. In an alternative embodiment, all items are provided on a single list, and all authorizations, unfettered or not, are established through authorization policies 103.

It should be noted that policy rule granularity may be adjusted as required by the policy providing entity wishing to control access to content, wherein the granularity establishes how users may access content 104 in the content control list. Various rules of use may be established for any piece of content by establishing policy rules. Policy rules provide access controls and may map to an operating system's file permissions. Policy rules may include the following content management abilities 104:

1.) (dis)allow importing
2.) (dis)allow exporting
3.) (dis)allow reading
4.) (dis)allow copying
5.) (dis)allow moving
6.) (dis)allow execution
7.) move content to a quarantine directory on the user's machine
8.) delete content
9.) (dis)allow a user's requested action (e.g., not allow a media file to play in a media browser)
10.) direct a user to a Web page (e.g., where the user might be prompted to purchase rights to content)
11.) provide a warning to the user (e.g., notifying the user they are attempting to access content without authorization)
12.) provide a dialogue box widget allowing the action to proceed or not
13.) and/or the like 104.

For example, if the user is redirected to a Web page, they may be prompted to purchase the content they are attempting to access before access is allowed. Also, in an alternative embodiment when a warning is provided, the warning may provide notice that the use or downloading of such content may result in legal action 104. In one alternative embodiment, local policies are secured and authenticated. In such an embodiment, the IDSL establishes secure authenticated communications for updates to that database. If the IDSL detects that that the polices a have been tampered with, or the signatures of the material to be controlled, then a more restrictive default policy is employed in place of the improperly altered policy.

Data identifiers may be prepared for a specified piece of content or for all items enumerated in the content control list 105. A data identifier is metadata that may include the following metadata field tags 106:

1.) a copyright owner field (e.g., a corporation's name and address)
2.) a file length
3.) a title
4.) unique identifiers (e.g., digital object identifiers, hashes (e.g., MD5), audio or video fingerprints, etc.)
5.) actions to be taken by the system to match the file to a unique identifier
6.) and/or the like 106.

It should be noted that the data identifier(s) may be prepared in advance of the provision of a content control list 101. Alternatively, they may be prepared before or after the setting of the policy rules 103. In an alternative embodiment, digital identifiers are prepared from actual copies of the content provided along width the content control list 101, whereby the IDSL controller then generates the data identifiers 105.

Policy rules and digital identifiers are provided to a centralized database engine to store the information and make it available for retrieval 107.

A system administrator may want to install, purchase, activate, and/or bundle the IDSL for a given product in a computer system 108. One example product type would be software. Depending upon the implementation and/or product 109, the IDSL may be embedded and/or activated in different manners. In the more generic case of software, a plug-in may be provided by which the IDSL can access data files 110. One example type of generic software that uses plug-ins is peer-to-peer software. Many applications provide APIs by which plug-ins have access to files that are to be read and/or written. The IDSL may be loaded into memory as a plug-in via API and act to control the manner in which files are read and/or written. In the case of P2P software, a plug-in may access data from the centralized database by performing a query over the network to obtain updates of content control list entries for the IDSL to monitor 110. Such locally updated content control lists may include both content information and unique data identifiers. Thus, in the case of P2P software, when a search for software is conducted and the P2P software obtains search results, the IDSL may check the search results and augment the results and any subsequent actions thereupon 111. Search results matching entries in the locally updated content control list 110 are acted upon by the IDSL. If there is no match, flow in the (P2P) software continues normally. Otherwise, through the P2P's API, the IDSL may filter the results and augment actions that may be taken. As such, policy rules will dictate any augmentation to be taken upon the results through the API via the plug-in. Most frequently this results in the blocking of unauthorized downloads 113. In an alternative embodiment, a "buy now" hyperlink may be added next to the search results in the P2P application. Such links would redirect a user to a Web page where they can purchase the rights to use the content legitimately. In another alternative embodiment, search results matching entries in the locally updated content control list 110 are filtered out and the user is blocked from downloading the file 113.

In an alternative implementation of the IDSL 109, IDSL enabled antivirus software may be updated upon receiving a content control list 115. As mentioned before, the content control list is provided by entities that wish to control the access of their content 101. The content control list entries are stored in the centralized database 107 and controlled by established policies 103. Such locally updated content control lists may include both content information and unique data identifiers. The IDSL in the antivirus software will obtain locally updated content control lists as provided to the central database 107 over the network. The IDSL may then check memory (e.g., a disk drive) via the antivirus software 116. As the antivirus software scans for files augmented by viruses, the IDSL examines the antivirus software's file search as well. Such examination may be conducted through an API. As such, the IDSL examines entire files for matches as enumerated in the locally updated content control list 117. If there is a match 117, then file matches are acted upon as set in the policy rules 103. Also, actions taken upon the file matches may be set by the system administrator 108. For example, either the policy rules 103 and/or the system administrator 108, may specify that any files found by an antivirus scan that match the locally updated content control list are to be quarantined in a specified directory, and that an email to that effect is sent to the administrator. Alternatively, if there is no match 117, then the antivirus software will continue to operate normally. In one embodiment, such policy rules 104 may simply delete matching content 118. Of course, all of the access controls already enumerated 104 may be employed in dealing with matching content 118.

In an alternative implementation of the IDSL 109, an IDSL enabled firewall is used to monitor content transferred over a network. An IDSL firewall may be updated by receiving a content control list 119. As mentioned before, the content control list is provided by entities that wish to control the access of their content 101. The content control list entries are stored in the centralized database 107 and controlled by established policies 103. Such locally updated content control lists may include both content information and unique data identifiers. The IDSL in the firewall will obtain locally updated content control lists as provided to the central database 107 over the network. The firewall is modified by the IDSL to examine network traffic coming into the client 120. Firewalls typically examine port addresses and (dis)allow communications across network ports wholesale, but they do so on a content agnostic basis. With the IDSL embedded in the firewall, traffic coming across the network may be parsed for data matching content enumerated in locally updated content control lists 121. Additionally, ports known for commonly transferring files that are in content control lists 219 may be blocked wholesale 122. In one embodiment, the centralized database 219 may maintain statistics of port addresses commonly used for the illicit transfer of content enumerated in content control lists. Such statistics may be garnered by establishing servers and monitoring data/port traffic as it flows across the server. In an alternative embodiment, filtering based on specific content over a range of ports to garner such statistics. Thereby, the IDSL database 219 may update all clients 119 to block all such common ports as frequency and usage changes 122. In an alternative embodiment, the IDSL firewall monitors for partial file segments through specified ports. In yet another alternative embodiment, the IDSL monitors incoming files as they span multiple ports by filtering for specific content as the content is reassembled. Whether the IDSL firewall examines the transfer of entire and/or partial files that match content enumerated in the locally updated content control list 121, or if the IDSL firewall blocks ports based on statistics, once a match is established, then the (file) transfer supporting port may be blocked 122. If there is a match 121, then the matched data is acted upon as set in the policy rules 103. Also, actions taken upon the matches may be set by the system administrator 108. In an alternative similar to the IDSL antivirus software embodiment, either the policy rules 103 and/or the system administrator 108 may specify that any files identified by the IDSL firewall scan that match the locally updated content control list are to be quarantined in a specified directory, and that an email to that effect is sent to the administrator. Alternatively, if there is no match 121, then the firewall will continue to operate normally. In one embodiment, such policy rules 104 may block ports from transferring data when matching content is identified 118. Of course, all of the access controls already enumerated 104 may be employed in dealing with matching content 122.

Integrated Data Security Layer Controller

Figure 2:
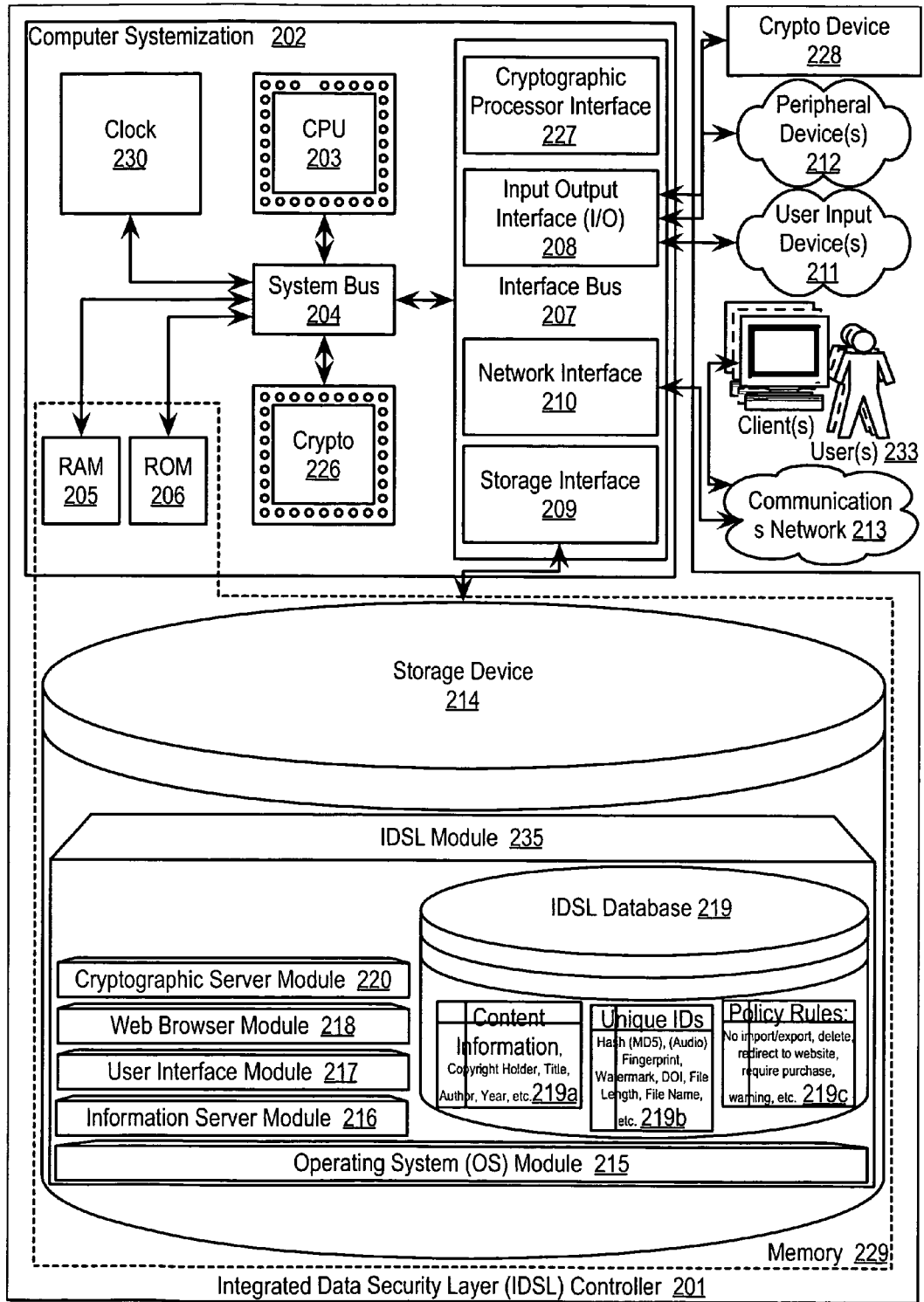
FIG. 2 is of a block diagram illustrating one embodiment of an integrated data security layer controller in accordance with the present invention.

FIG. 2 illustrates one embodiment incorporated into an Integrated Data Security Layer (IDSL) controller 201. In this embodiment, the IDSL controller 201 may serve to register, process, store, search, identify, generate, match, and/or update requests of content identifying information, policy rules, and/or any associated information, and/or the like.

In one embodiment, the IDSL controller 201 may be connected to and/or communicate with entities such as, but not limited to: one or more users from user input devices 211;

peripheral devices 212; and/or a communications network 213. The IDSL controller may even be connected to and/or communicate with a cryptographic processor device 228.

An IDSL controller 201 may be based on common computer systems that may comprise, but are not limited to, components such as: a computer systemization 202 connected to memory 229.

Computer Systemization

A computer systemization 202 may comprise a clock 230, central processing unit (CPU) 203, a read only memory (ROM) 206, a random access memory (RAM) 205, and/or an interface bus 207, and most frequently, although not necessarily, are all interconnected and/or communicating through a system bus 204. Optionally, a cryptographic processor 226 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium and/or Xeon; and/or the like processor(s). The CPU interacts with memory through signal passing through conductive conduits to execute stored program code according to conventional data processing techniques. Such signal passing facilitates communication within the IDSL controller and beyond through various interfaces.

Interface Adapters

Interface bus(ses) 207 may accept, connect, and/or communicate to a number of interface adapters, conventionally although not necessarily in the form of adapter cards, such as but not limited to: input output interfaces (I/O) 208, storage interfaces 209, network interfaces 210, and/or the like. Optionally, cryptographic processor interfaces 227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), Personal Computer Memory Card International Association (PCMCIA), and/or the like.

Storage interfaces 209 may accept, communicate, and/or connect to a number of storage devices such as, but not limited to: storage devices 214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 210 may accept, communicate, and/or connect to a communications network 213. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface.

Input Output interfaces (I/O) 108 may accept, communicate, and/or connect to user input devices 211, peripheral devices 212, cryptographic processor devices 228, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, composite, digital, Digital Visual Interface (DVI), RCA, S-Video, VGA, and/or the like; wireless; and/or the like. A common output device is a video display, which typically comprises a Cathode Ray Tube (CRT) or Liquid Crystal Display (LCD) based monitor with an interface (e.g., DVI circuitry and cable) that accepts signals from a video interface. The video interface composites information generated by a computer systemization and generates video signals based on the composited information in a video memory frame. Typically, the video interface provides the composited video information through a video connection interface that accepts a video display interface (e.g., a DVI connector accepting a DVI display cable).

User input devices 211 may be card readers, dongles, finger print readers, gloves, graphics tablets, joysticks, keyboards, mouse (mice), trackballs, trackpads, retina readers, and/or the like.

Peripheral devices 212 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, visors, and/or the like.

Cryptographic units such as, but not limited to, microcontrollers, processors 226, interfaces 227, and/or devices 228 may be attached, and/or communicate with the IDSL controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 229. However, memory is a fungible technology and resource, thus, any number of memory embodiments may be employed in lieu of or in concert with one another. It is to be understood that an IDSL controller and/or a computer systemization may employ various forms of memory 229. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 229 will include ROM 206, RAM 205, and a storage device 214. A storage device 214 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 229 may contain a collection of program and/or database modules and/or data such as, but not limited to: operating system module(s) 215 (operating system); information server module(s) 216 (information server); user interface module(s) 217 (user interface); Web browser module(s) 218 (Web browser); database(s) 219; cryptographic server module(s) 220 (cryptographic server); IDSL module(s) 225; and/or the like (i.e., collectively a module collection). These modules may be stored and accessed from the storage devices and/or from storage devices accessible through an interface bus. Although non-conventional software modules such as those in the module collection, typically, are stored in a local storage device 214, they may also be loaded and/or stored in memory such as: peripheral devices, RAM, remote storage facilities through a communications network, ROM, various forms of memory, and/or the like.

Operating System

The operating system module 215 is executable program code facilitating the operation of an IDSL controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the IDSL controller to communicate with other entities through a communications network 213. Various communication protocols may be used by the IDSL controller as a subcarrier transport mechanism for interaction, such as, but not limited to: multicast, TCP/IP, UDP, unicast, and/or the like.

Information Server

An information server module 216 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a IDSL controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the IDSL database 219, operating systems, other program modules, user interfaces, Web browsers, and/or the like.

Access to IDSL database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the IDSL. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the IDSL as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

A user interface module 217 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 218 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from IDSL enabled nodes. The combined application may be nugatory on systems employing standard Web browsers.

IDSL Database

An IDSL database module 219 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the IDSL database may be implemented using various standard data-structures, such as an array, hash, (linked) list, struct, structured text file (e.g., XML), table, and/or the like. Such data-structures may be stored in memory and/or in (structured) files. If the IDSL database is implemented as a data-structure, the use of the IDSL database may be integrated into another module such as the IDSL module. Databases may be consolidated and/or distributed in countless variations through standard data processing techniques. Portions of databases, e.g., tables, may be exported and/or imported and thus decentralized and/or integrated. In one embodiment, the database module 219 includes tables three tables 219*a-c*. A content information table 219*a* includes fields such as, but not limited to: author name, content title, copyright holder, unique identifier key field, year of publication, and/or the like. A unique identifier table 219*b* includes fields such as, but not limited to: assigned values (e.g., a Book Item and Component Identifier (BICI), Digital Object Identifier (DOI), International Standard Audiovisual Number (ISAN), International Standard Book Number (ISBN), International Standard Music Number (ISMN), International Standard Serial Number (ISSN), Library of Congress Control Number (LCCN), Serial Item and Contribution Identifier (SICI), Standard Address Number (SAN), Standard Technical Report Number Format (STRNF), etc.), digital fingerprints (Message Digest 5 hash, watermarks, etc.), file attributes (e.g., creation date, length, modification date, name, permissions, resource metadata, etc.), and/or the like. It should be noted that any of the truly unique fields may be designated as a key field throughout. A policy rules table 219*c* includes fields such as, but not limited to: block, delete, move, no export, no import, redirect to website, report identity, report use, require purchase, unique identifier key field, warning, and/or the like. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 219*a-c*. The IDSL may be configured to keep track of user requests and various transactions via database controllers.

An IDSL database may communicate to and/or with other modules in a module collection, including itself, and/or facilities of the like. Most frequently, the IDSL database communicates with an IDSL module, other program modules, and/or the like. The database may contain, retain, and provide information regarding other nodes and data.

Cryptographic Server

A cryptographic server module 220 is stored program code that is executed by the CPU 203, cryptographic processor 226, cryptographic processor interface 227, cryptographic processor device 228, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable an IDSL module to engage in secure transactions if so desired. The cryptographic module facilitates the secure accessing of resources on IDSL and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

IDSL

An IDSL module 235 is stored program code that is executed by the CPU. The IDSL affects accessing, obtaining and the provision of information, and/or the like both on a local client and as between nodes on a communications network. The IDSL has the ability to obtain content information, policy rules regarding the content, and unique identifiers for the content from content providers and/or their proxies. Further, the IDSL has the ability to provide such information to IDSL clients. Such clients employ the obtained information to analyze and control access to the content. Further, the IDSL may act as a lookup facility to create, maintain, and update associations between content information, policy rules, and unique identifiers of content, and/or any other associated information as detailed throughout. The IDSL coordinates with the IDSL database to identify interassociated items in the generation of entries regarding any related information. An IDSL module enabling access of information between nodes may be developed by employing standard development tools such as, but not limited to: (ANSI) (Objective-) C (++); Apache modules, binary executables, Java, Javascript, mapping tools, procedural and object oriented development tools, PERL, Python, shell scripts, SQL commands, web application server extensions, WebObjects, and/or the like. In one embodiment, the IDSL server employs a cryptographic server to encrypt and decrypt communications. The IDSL may administer policies, analyze and catalog content, generate unique identifiers, service requests, update association information for content and identifiers, and much more. An IDSL module may communicate to and/or with other modules in a module collection, including itself, and/or facilities of the like. Most frequently, the IDSL module communicates with an IDSL database, operating systems, other program modules, and/or the like. The IDSL may contain, communicate, generate, obtain, and/or provide program module, system, user, and/or data communications, requests, and/or responses.

Distributed IDSL

The structure and/or operation of any of the IDSL node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the IDSL controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the configuration will depend upon the context of system deployment.

Finally, it is to be understood that the logical and/or topological structure of any combination of the module collection, other components and/or any present inventions as described in the figures and/or throughout are not limited to a fixed operating order and/or arrangement, but rather, any disclosed order is exemplary and all functional equivalents, regardless of order, are contemplated by the disclosure. Furthermore, it is to be understood that such structures are not limited to serial execution, but rather, any number of threads, processes, services, servers, and/or the like that may execute asynchronously, simultaneously, synchronously, and/or the like are contemplated by the disclosure.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

In addition, the disclosure herein includes other inventions not presently claimed. Applicant reserves all rights in those presently unclaimed inventions including the right to claim such inventions, file additional applications, continuations, continuations in part, divisions, and/or the like thereof.

What is claimed is:

1. An apparatus, comprising:
a memory;
one or more processors, coupled to the memory, the one of more processors enabled to perform the following steps:
activate an integrated data security layer operating at a firewall of a local area network, said integrated security layer locating at least one peer-to-peer software client operating on a node resident within the local area network;
determine at the firewall that the peer-to-peer software client is attempting to download at least one non-executable multimedia file from a second peer-to-peer software client operating in an ad-hoc peer-to-peer network including the at least one peer-to-peer software client, wherein the second peer-to-peer software client is not a website and is communicatively coupled to the first peer-to-peer software client from outside of the local area network via the internet;
route the at least one non-executable multimedia file to a quarantine storage area on a user's machine and send an email to an administrator;
analyze the at least one non-executable multimedia file to determine one or more data identifiers, said one or more data identifiers including at least one of fingerprint or metatag information used to ascertain the legitimacy of the at least one non-executable file, said data identifiers being prepared from actual content;
obtain a content control list from a copyright holder, said list identifying one or more unauthorized multimedia files and actions to be taken by the integrated data security layers when any of the one or more unauthorized multimedia files are encountered;
monitoring said content control list with a provisioning entity, said provisioning entity being verified, by a digital signature, by the data security layer;
wherein said content control list additionally monitors statistics of port addresses commonly used for the elicit transfer of content enumerated in the content control list, said statistics being garnered by establishing a server and monitoring data port traffic as it flows across the server;
wherein said content control list includes: a content information table, a unique identifier table and a policy rules table;
wherein the content information table includes a field selected from the group consisting of: author name, content title, copyright holder, unique identifier key and year of publication;
wherein the unique identifier table includes a field selected from the group consisting of: assigned values, digital fingerprints and file attributes;
wherein the policy rules table includes a field selected from the group consisting of: block, delete, move, no export, no import, redirect to website, report identity, report use, require purchase and warning;
determine if the one or more data identifiers match an unauthorized multimedia file in the content control list, wherein the integrated data security layer executes at least one action defined by the content control list if the one or more data identifiers match an unauthorized multimedia file; and
if the one or more identifiers do not match an unauthorized multimedia file, route the non-executable multimedia file from the quarantine storage area to the peer-to-peer software client; and
if the one or more identifiers match an unauthorized multimedia file, opening a web page to purchase the multimedia file.

2. The apparatus of claim 1, wherein the at least one non-executable multimedia file includes one or more of textual data, audio data and video data.

3. The apparatus of claim 1, wherein the actions in the content control list include at least one of allowing or disallowing importation of the file, deleting of the file from the quarantine storage area, warning the user about an unauthorized multimedia file and allowing a user to purchase rights to the unauthorized multimedia file.

4. The apparatus of claim 1, wherein the integrated data security layer is a plug-in to the program, the plug-in further being at least one of a program stub code and an API.

5. The apparatus of claim 1, wherein a report of the unauthorized multimedia files discovered by the integrated data security layer is automatically sent to a specified entity.

* * * * *